Inventor
Leonard H. Sence

United States Patent Office 3,039,778
Patented June 19, 1962

3,039,778
LIQUID SEAL
Leonard H. Sence, East Troy, Wis., assignor to Allis-Chalmers Manufacturing Company, Milwaukee, Wis.
Filed Nov. 17, 1958, Ser. No. 774,257
6 Claims. (Cl. 277—3)

This invention relates to a sealing device for controlling the leakage of fluid in a high pressure area. More particularly this invention relates to a sealing device for controlling the leakage between a rotating element and a stationary element.

In handling fluids under high pressure with apparatus such as pumps and turbines, leakage between the rotating shaft of the apparatus and its stationary housing elements frequently presents a serious problem. In many applications of such pumps the fluid being handled is of such a nature that it is extremely essential that fluid leakage be at a minimum. This particularly true when the fluid being handled is a precious or hazardous type. Mechanical seals have been devised in an attempt to control such leakage but these seals have been found to be unsuitable in certain types of high pressure pumps due to their tendency to wear. Another type of seal generally referred to as a liquid seal has often been found to be more practical for high pressure pumps. Liquid seals in general have a sleeve which rotates with the shaft. The sleeve has a flat surface at one end which defines a small annular sealing gap with a stationary element. The sleeve and the stationary element are designed to maintain a gap therebetween because of balanced forces on opposite ends of the sleeve. As long as the rotating sleeve and the stationary element maintain a gap neither of the elements will be subjected to any substantial amount of wear. Consequently, the size of the gap between the sleeve and stationary element can be reasonably controlled and fluid leakage through the gap likewise can be held to a minimum acceptable rate.

In the prior art liquid seals have been provided with a spring means for effecting a balanced pair of opposing forces. As a result of the spring means which urges the sealing sleeve toward the stationary element, cold starts occur. Cold starts cause scoring of the sealing surfaces of the sleeve in stationary element which result when they are forced into contact by the spring means during initial periods of operation. Consequently, until the pressure in the area in which the sealing device is confined builds up sufficiently the spring means will force the sleeve against the stationary element, thereby causing wearing and scoring of the parts. Although such cold starts sometimes last for only a matter of seconds the scoring effect becomes noticeable when the pump is started and stopped a number of times. Once the sealing surfaces become so scored as to cause a gap wider than desired between the surfaces it becomes necessary to replace the sealing elements in order to prevent an undesirable amount of leakage in the gap. Furthermore, inasmuch as the spring means varies its force as its extent of compression varies it becomes apparent that the opposite forces must also vary in order to maintain a balanced liquid seal. This variation in counteracting forces is generally accomplished by pressure changes caused by variations in the size of the gap between the sleeve and stationary element. Therefore, the limits of pressure at which such sealing devices may effectively operate are dependent upon the force limit of the spring means urging the sleeve against the stationary element. At extremely high pressures the effect of the spring means will be overcome by opposing pressure forces and as a result the gap between the sealing surfaces will increase to an undesirable amount.

The present invention overcomes the above disadvantages by providing a sealing device comprising two orifices or sealing gaps in series. Scoring and wearing between the sealing surfaces of the device in this invention due to cold starts are eliminated. Furthermore, the size of the sealing gap of this invention is maintained constant and is independent of the pressures in the confined area. In such a manner leakage of fluid can be controlled to a high degree of accuracy and limited to a minute amount.

It is, therefore, one object of this invention to provide a sealing device for controlling the leakage between a rotating element and a stationary element.

Another object of this invention is to provide a new and improved sealing device which controls fluid leakage of high pressure pumps.

Another object of this invention is to provide a new and improved liquid seal which shows substantially no wear between its sealing surfaces.

Objects and advantages other than those set forth above will be apparent from the following description when read in connection with the accompanying drawing, in which.

Figure 1:
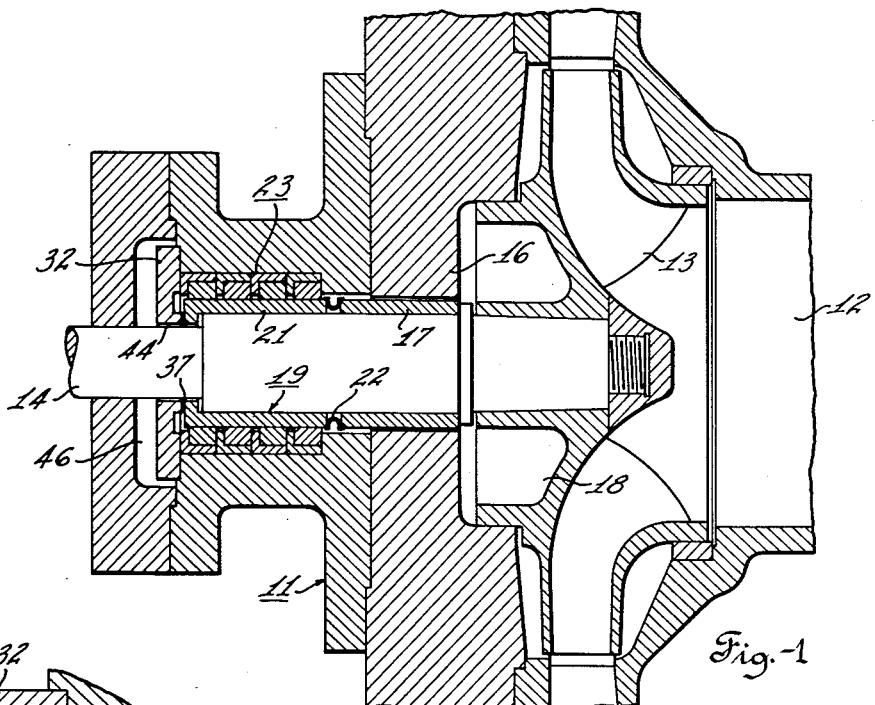
FIG. 1 is a longitudinal sectional view of a portion of a high pressure pump embodying the seal of this invention.
Figure 2:
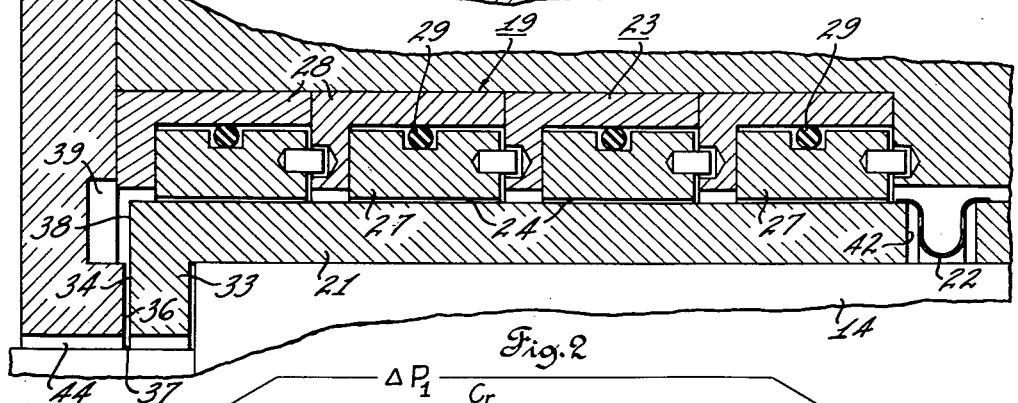
FIG. 2 is an enlarged view of a portion of the sealing device of this invention in cooperation with a rotating element and a stationary element.

Referring particularly to FIG. 1 a portion of a high pressure centrifugal pump 11 capable of handling fluids at pressures exceeding 2000 p.s.i. is illustrated. In communication with an inlet 12 is an impeller 13 driven by a rotatable shaft 14. An annular portion 16 of a conventional pump housing circumscribes shaft 14. Disposed between the housing and shaft 14 is an annular bushing 17. Bushing 17 is mounted to rotate with the shaft and is spaced from the housing to provide a fluid passage in hydraulic communication with chamber 18 at the rear of impeller 13. To the rear of the bushing 17 and also circumscribing the impeller shaft is a sealing device 19. An annular sleeve member 21 is concentrically positioned about the rotatable shaft 14 and preferably keyed thereto in sealing engagement in such a manner as to limit relative motion between the sleeve member 21 and shaft to axial movement. Thus, the sleeve member rotates with the shaft and is free to slide axially along a portion of the shaft to allow for axial expansion in the shaft. The sleeve member 21 is flexibly coupled to the bushing 17 by an expansible element such as bellows 22 to also allow for axial shaft expansion. As more clearly shown in the enlarged view of FIG. 2 a pressure breakdown means 23 is mounted over the annular sleeve member 21. The inner diameter of the pressure breakdown means 23 exceeds the outer diameter of sleeve member 21 to define an annular orifice 24 or pressure reducing fluid passage therebetween. The pressure breakdown means in the particular case comprises a number of floating ring seals 27 cooperating with L-rings 28 with flexible O-rings 29 therebetween. It is to be understood that this is only one of a number of means capable of reducing pressure and maintaining an orifice between the pressure breakdown means and sleeve member suitable for use in this invention.

In end abutment with the sleeve member 21 and pressure breakdown means 23 is an annular stationary housing element 32, which in the illustrated embodiment is a face seal plate of the pump circumscribing the shaft. End 33 of the sleeve member has a flat surface with a radially inner portion 34 which cooperates with a flat surface 36 of the stationary element 32 to define an orifice 37 or restricted fluid passage therebetween. The remaining radially outer portion 38 of end 33 of the sleeve member defines an intermediate pressure chamber 39 with the stationary element. The orifice 24 between the pressure breakdown means 23 and the sleeve member is thereby hydraulically connected to the orifice 37 between the end 33 of the sleeve member and the stationary element 32 by the intermediate pressure chamber 39. In such a manner a passage is provided for controlled leakage flow of fluid being handled by the high pressure pump.

In operation as the impeller is rotated fluid is brought forth through the inlet 12. The fluid is outwardly propelled by impeller 13. Some of the fluid leaks into chamber 18, a high pressure area where it strives to escape to an area of lower pressure. Consequently, some of the fluid in the high pressure area 18 leaks between bushing 17 and housing 16. Inasmuch as pressure breakdown means 23 is of a floating type it, therefore, becomes spaced from the shaft 14 once fluid starts circulating through the pump and orifice 24 assumes a generally annular shape. The leakage flow continues through orifice 24 formed between the pressure breakdown means and the sleeve member 21. As the fluid exits orifice 24 it enters the intermediate pressure chamber 39. Assuming that the sleeve member inner portion 34 is initially in contact with the stationary element face 36, liquid entering into intermediate pressure chamber 39 has no place to escape and, consequently, pressure within this chamber instantaneously builds up to equal the pressure on end 42 of the sleeve member 21. Since the area of the radially outer portion 38 of the sleeve member is slightly larger than the area of the other end 42 of the sleeve member the sleeve member 21 tends to shift toward the direction of the impeller. This is because with approximately equal pressures at sleeve ends 33 and 42 the force at portion 38 is greater than the force on end 42. When the sleeve member shifts toward the impeller, which occurs almost instantaneous with the starting of the pump, a second orifice 37 is formed between the surfaces of the sleeve member and the stationary element, thereby providing an escape for the fluid. As fluid flows through orifice 37 into a low pressure area 44, which for purposes of explanation can be considered zero pressure, the pressure in the intermediate chamber 39 immediately drops below the pressure at sleeve end 42 to an amount dependent upon the type of pressure breakdown means used and its design.

Consequently, the force now at the outer portion 38 of the sleeve member end 33 is less than that applied on the other end 42. Nevertheless, the sleeve member still remains balanced. This is because an additional force has been placed on end 33 of the sleeve member since there is now pressure on the inner portion 34 of the sleeve. By careful designing of the pressure breakdown means and end portions 34 and 38 of the sleeve member the pressure across inner portions 34 times the area of portion 34 plus the effective pressure across outer portion 38 times the area of end portion 38 equal the pressure across sleeve end 42 times the area of end 42. If the sleeve member 21 should inadvertently be caused to be moved toward the stationary element 32 by some force such as a mechanical shock on the pump the orifice 37 therebetween is narrowed. Consequently, pressure in chamber 39 is increased thereby increasing the force on end 33 of the sleeve member. This additional force, in turn, causes the sleeve member to be moved toward the impeller thereby restoring the orifice 37 to its previous width. In similar fashion should the sleeve member 21 be moved toward the impeller 13, pressure at end 33 of the sleeve member drops, thereby causing an unbalanced force on the sleeve member end 42 which restores the member to its balanced position. Thus, by combining two orifices in series a self-adjusting high pressure seal is provided which balances without the use of springs or other devices that cause wear on sealing surfaces.

After the leakage fluid has passed through the two orifices in series it may be collected in a reservoir by tapping it off with a recovery conduit connected to a suitable point such as chamber 46 (see FIG. 1) adjacent the exit of orifice 37. When the reservoir is filled it may be emptied by using an auxiliary high pressure pump to return the fluid into the pumping system, such as at inlet 12.

As previously mentioned, another advantage of this novel seal arrangement is that the face clearance or orifice 37 between end 33 of the sleeve member and stationary element 32 is independent of the pressure applied to the seal. This can be proven algebraically with reference to FIG. 3.

Figure 3:
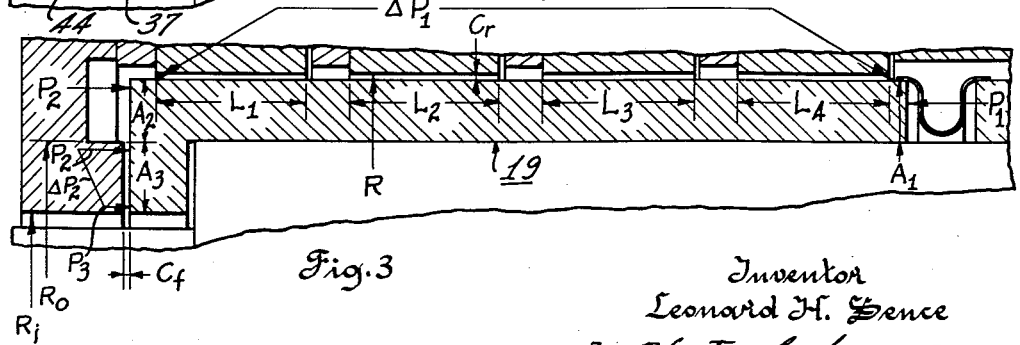
FIG. 3 is an enlarged view of a portion of the sealing device of this invention illustrating pressure gradients on the seal.

For purposes of calculation the following symbols represent values indicated in FIG. 3:

$Q$ = quantity of fluid passing through an orifice per unit time.
$\Delta P_1$ = pressure differential between the ends of the pressure breakdown means 23.
$C_r$ = radial clearance or orifice clearance 24 between the pressure breakdown means 23 and the sleeve member 21.
$R$ = radius of the pressure breakdown means 23.
$\mu$ = viscosity of the fluid, absolute or dynamic.
$L = L_1 + L_2 + L_3 + L_4$, the combined length of individual seals in pressure breakdown means 23.
$\Delta P_2$ = pressure differential across the inner portion 34 of the sleeve end 33.
$C_f$ = orifice clearance between the two surfaces of the stationary element 32 and sleeve end 33.
$R_o$ = radius of the outer surface of end 33.
$R_i$ = radius of the inner surface of end 33.
$A_1$ = area of sleeve end 42.
$A_2$ = area of outer portion of sleeve end 33.
$A_3$ = area of inner portion of sleeve end 33.
$P_1$ = pressure over end 42.
$P_2$ = pressure over outer portion 38 of sleeve end 33.
$P_3$ = pressure at area 44 = 0.

The equation for flow of fluid through orifice 24 formed between the pressure breakdown means and the sleeve member is:

*Equation No. 1*

$$Q = \frac{\pi \Delta P_1 C_r^3 R}{4 \mu L}$$

The equation for the quantity of fluid going through orifice 37 between the end of the sleeve member and the stationary element is:

*Equation No. 2*

$$Q = \frac{\pi \Delta P_2 C_f^3}{6 \mu \log_e \frac{R_o}{R_i}}$$

See "Analysis and Lubrication of Bearings," Shaw and Macks, page 559 (1949).

By design assume that L over R equal 3/2. Since the two orifices through which fluid flows are connected in series the quantity of fluid through each is equal. Thus, we have the following:

*Equation No. 3*

$$\frac{\pi \Delta P_1 C_r^3}{6 \mu} = \frac{\pi \Delta P_2 C_f^3}{6 \mu \log_e \frac{R_o}{R_i}}$$

In dividing through on both sides of Equation 3 by $$\frac{\pi}{6 \mu}$$

we have:

*Equation No. 4*

$$\Delta P_1 C_r^3 = \frac{\Delta P_2 C_f^3}{\log_e \frac{R_o}{R_i}}$$

From experimental data the total effective pressure at $A_3$ is approximately one-half the pressure $P_2$ at $A_2$ when orifice 37 exists. Consequently, Equation 5 represents the balanced opposed forces on the two ends 33 and 42 of the sleeve member.

*Equation No. 5*

$$P_1 A_1 = P_2 A_2 + .5 P_2 A_3$$

Dividing both sides of Equation 5 by $A_1 P_2$ we have the following equation:

*Equation No. 6*

$$\frac{P_1}{P_2} = \frac{A_2 + .5 A_3}{A_1} = K_1$$

Since the right hand side of Equation 6 concerns only constant area dimensions of the seal this side can be represented by constant $K_1$. Therefore:

*Equation No. 7*

$$P_1 = P_2 K_1$$

By definition:

*Equation No. 8*

$$\Delta P_1 = P_1 - P_2$$

and:

*Equation No. 9*

$$\Delta P_2 = P_2 \text{ since } P_3 = 0$$

Substituting the right hand side of Equation 7 into Equation 8 we have the following:

*Equation No. 10*

$$\Delta P_1 = P_2 K_1 - P_2 = P_2 (K_1 - 1) = P_2 K_2$$

where $K_2 = K_1 - 1$

Substituting $P_2 K_2$ for $\Delta P_1$ and $P_2$ for $\Delta P_2$ in Equation 4 we have the following equation:

*Equation No. 11*

$$P_2 K_2 C_r^3 = \frac{P_2 C_f^3}{\log_e \frac{R_o}{R_i}}$$

Dividing Equation 11 through by $P_2$ and solving for $C_f$ we have the following result which represents the clearance between the orifice 37:

*Equation No. 12*

$$C_f = C_r \sqrt[3]{K_2 \log_e \frac{R_o}{R_i}}$$

The right hand side of Equation 11 contains only constants. Consequently, $C_f$ is also a constant.

It is, therefore, proved that the face clearance, $C_f$, is a function of design and not of pressure applied to the seal. Consequently, this seal can operate over a range of pressures and pressure surges without external adjustment or malfunction.

Although the illustrated embodiment operates on the same fluid being pumped it is to be understood that an injection fluid for a seal buffering system is also suitable. The injection fluid is introduced into the sealing device at a pressure above that of the pump system, such as a differential of 50 p.s.i. Upon passing through the two orifices in series, the injection fluid is collected and restored into the seal buffering system.

This invention provides a new and improved seal which efficiently controls the rate of leakage between face clearances of a high pressure pump sealing device without causing damage to any of the seal components. The face clearance between sleeve member 21 and stationary element 32 can be selected independent of the pressure applied to sealing device 19. It is, therefore, apparent that the seal gap can be reduced to an extremely small gap. Because of these unique features the floating ring seals of pressure breakdown means 23 and sleeve member 21 can be manufactured of the most suitable materials from the standpoint of hardness, wear and shock resistance, as well as for compatibility and similarity of expansion coefficients.

Although only one embodiment of the present invention has been illustrated and described it will be apparent to those skilled in the art that various changes and modifications may be made therein without departing from the spirit of the invention or from the scope of the appended claims.

Having now particularly described and ascertained the nature of my said invention and the manner in which it is to be performed, I declare that what I claim is:

1. In a liquid seal device for controlling the rate of leakage between a stationary element and a rotatable shaft a housing for said rotatable shaft, an annular member in sealing relationship about said shaft with relative motion therebetween limited to axial movement, a surface on one end of said annular member being spaced from said stationary element and subjected to high pressure fluid, a pressure breakdown means surrounding said annular member and defining with said annular member passage for controlled fluid leakage therebetween whereby said high pressure fluid flows through said passage into an intermediate pressure chamber, said intermediate pressure chamber formed by a surface of said stationary element and a portion of the adjacent end of said annular member, a second portion of said adjacent end and said stationary element defining a restricted passage in downstream relation to and in fluid communication with said intermediate pressure chamber and a low pressure area whereby fluid flow through said passages and said intermediate chamber maintains said stationary element and said adjacent end of said annular member in a relative fixed spaced position independent of the magnitude of pressure on said surface on said one end of said annular member during flow of fluid.

2. In a centrifugal pump for handling fluids at high pressures a sealing device for controlling the rate of leakage between an impeller shaft and a stationary element circumscribing said shaft, said sealing device comprising: an annular sleeve member in sealing engagement with said shaft for rotation therewith and in slidable engagement along a predetermined length of the axis of said shaft, one end of said sleeve being spaced from said stationary element and subjected to high pressure fluid; a pressure breakdown means surrounding said sleeve member and defining an annular pressure reducing passage therewith extending the length of said sleeve member for passage of fluid from a high pressure area to an intermediate pressure chamber; said intermediate pressure chamber formed between said stationary element and an annular portion of the adjacent end of said sleeve member; a second annular portion of said adjacent end comprising a flat surface parallel to said stationary element and defining an annular restricted passage therebetween, said restricted passage being in downstream relation to and in fluid communication with said intermediate pressure chamber; and a low pressure area whereby pressure from flow of fluid through said passages maintains a continuous balanced force on said adjacent sleeve end with respect to forces exerted by fluid at said high pressure area on the opposite end of said sleeve member to establish a fixed spaced relationship between said sleeve and said stationary element.

3. In an apparatus for handling fluid at high pressure a device for controlling the rate of leakage between a rotatable shaft and a stationary element circumscribing said shaft, said device comprising: a sleeve member in engagement about said shaft, one end of said sleeve being spaced from said stationary element and subjected to high pressure fluid, means limiting relative movement therebetween to axial movement; a pressure breakdown means surrounding said sleeve member and defining therewith an annular passage extending the length of said sleeve member whereby fluid under high pressure flows through said passage into an intermediate pressure chamber; said intermediate chamber defined by said stationary element, said pressure breakdown means, and a radially outer annular portion of the adjacent end of said sleeve member; a radially inner annular portion of said adjacent end of said sleeve member defining an annular restricted passage with said stationary element and connecting said intermediate pressure chamber with a low pressure area whereby fluid flow through said passages and said intermediate pressure chamber maintains said stationary element and said sleeve member at a relative fixed spaced relationship independent of the magnitude of fluid pressure in said apparatus.

4. A seal for controlling fluid leakage from a high pressure area to a low pressure area between a rotary element and a stationary element circumscribing said rotary element, said seal comprising: a first annular member concentrically positioned around said rotary element; means connecting said first annular member in fluid sealing relation to one of said elements and limiting relative movement therebetween to the axial direction; a surface on one end of said first annular member being spaced from said stationary element and subjected to the pressure from said high pressure area; a second annular member concentrically positioned around said rotary element and defining with said first annular member a fluid pressure reducing passage in fluid communication with the pressurized fluid acting on said first surface; means connecting said second annular member in fluid sealing relation to the other of said elements; a restricted fluid passage defined by a portion of the other end of said first annular member and a surface portion of said stationary element in fluid communication with said low pressure area, the surface area of said portion of said other end of said first annular member being subjected to the pressure at the end of said restricted fluid passage whereby the resultant force thereon resists the force of the pressurized fluid acting on said surface of said one end of said first annular member; and an intermediate pressure chamber defined by an additional portion of the other end of said first annular member and a surface portion of said stationary element interposed between and in fluid communication with said restricted fluid passage and said pressure reducing passage, the surface area of said additional portion of said other end of said first annular member being subjected to the pressure in said intermediate pressure chamber whereby the resultant force thereon resists the force of the pressure fluid acting on said surface of said one end of said first annular member.

5. A seal for controlling fluid leakage from a high pressure area to a low pressure area between a rotary element and a stationary element circumscribing said rotary element, said seal comprising: a first annular member concentrically positioned around said rotary element; means connecting said annular member in fluid sealing relation to said rotary element and limiting relative movement therebetween to the axial direction; a first surface on one end of said annular member being spaced from said stationary element and subjected to fluid pressure from said high pressure area; a pressure breakdown means surrounding said annular member and defining therewith an annular pressure reducing fluid passage in fluid communication with said first surface; means connecting said pressure breakdown means in fluid sealing relation to said stationary element; an annular fluid restricting passage defined by the inner radial portion of the other end of said annular member and a surface of said stationary element in fluid communication with said low pressure area; walls defining an intermediate pressure chamber between said stationary element and said annular member interposed between and in fluid communication with said pressure reducing passage and said annular fluid restricting passage; an annular surface formed on said outer radial portion of the other end of said annular member being subjected to the fluid pressure in said intermediate chamber, said second surface area being larger than said first surface area so that when the pressure in said intermediate pressure chamber reaches a predetermined percentage of the pressure in said high pressure area the force acting on said other end of said annular member exceeds the force acting on said one end of said annular member, and the area of the surface of said inner radial portion of said other end of said annular member combining with the area of said outer radial portion of said other end of said annular member whereby the force on said other end of said annular member equals the force on said one end of said annular member when said fluid restricting passage has reached a predetermined size.

6. A seal for controlling fluid leakage from a high pressure area to a low pressure area between a rotary element and a stationary element circumscribing said rotary element, said seal comprising: a first annular member concentrically positioned around said rotary element; means connecting said first annular member in fluid sealing relation to one of said elements and limiting relative movement therebetween to the axial direction; a surface on one end of said first annular member being spaced from said stationary element and subjected to the pressure from said high pressure area; a second annular member concentrically positioned around said rotary element and defining with said first annular member a fluid pressure reducing passage in fluid communication with the pressurized fluid acting on said first surface; means connecting said second annular member in fluid sealing relation to the other of said elements; a restricted fluid passage defined by a portion of the other end of said first annular member and a surface portion of said stationary element in fluid communication with said low pressure area, the surface area of said portion of said other end of said first annular member being subjected to the pressure in said restricted fluid passage whereby the resultant force thereon resists the force of the pressurized fluid acting on said surface of said one end of said first annular member; and an intermediate pressure chamber defined by an additional portion of the other end of said first annular member and a surface portion of said stationary element interposed between and in fluid communication with said restricted fluid passage and said pressure reducing passage, the surface area of said additional portion of said other end of said first annular member being subjected to the pressure in said intermediate pressure chamber whereby the resultant force thereon resists the force of the pressure fluid acting on said surface of said one end of said first annular member.

References Cited in the file of this patent

UNITED STATES PATENTS

| | | |
|---|---|---|
| 1,996,780 | Wheeler | Apr. 9, 1935 |
| 2,007,414 | Weis | July 9, 1935 |
| 2,087,313 | Biegelow et al. | July 20, 1937 |
| 2,328,578 | Payne | Sept. 7, 1943 |
| 2,329,990 | Hornschuch | Sept. 21, 1943 |
| 2,383,862 | Hornschuch | Aug. 28, 1945 |
| 2,479,265 | Roshong | Aug. 16, 1949 |
| 2,761,711 | Ecker | Sept. 4, 1956 |